Patented Oct. 24, 1922.

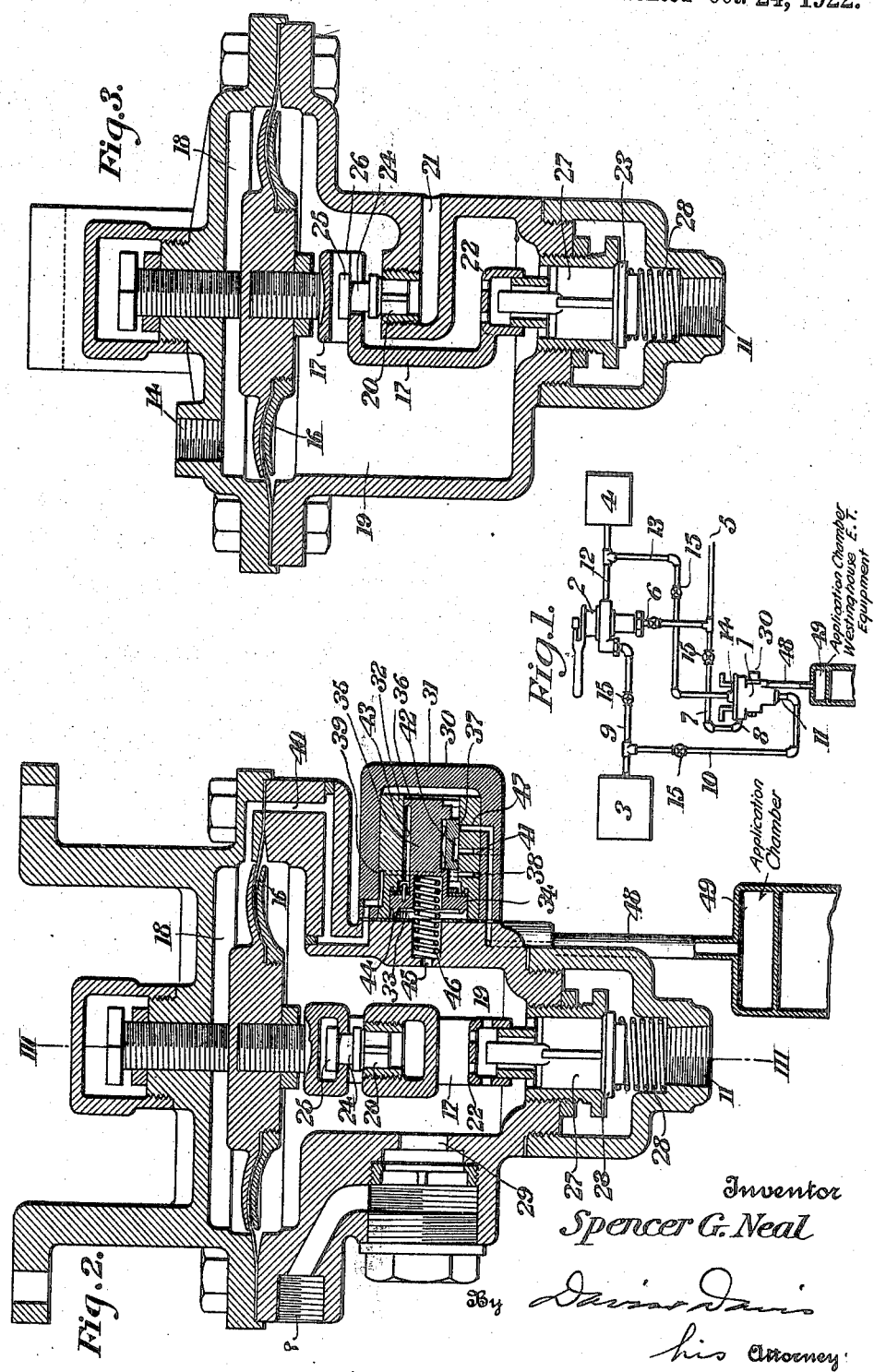

1,433,407

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

COMPENSATING VALVE.

Application filed January 3, 1921. Serial No. 434,739.

*To all whom it may concern:*

Be it known that I, SPENCER G. NEAL, a citizen of the United States, and resident of the borough of Manhattan, city, county, and State of New York, have invented certain new and useful Improvements in Compensating Valves (Case No. 40), of which the following is a specification.

This invention relates to improvements in that type of compensating valves shown in Patent No. 1,089,579, dated March 10, 1914, and also shown in Patent No. 1,314,975, dated September 2, 1919. These compensating valves are operated by equalizing reservoir pressure and brake pipe pressure and control a connection between the main reservoir and the brake pipe and between the brake pipe and atmosphere, and maintain a uniform brake pipe pressure.

The object of this invention is to provide means to insure a rapid reduction in equalizing reservoir pressure when the engineer's brake valve is placed in emergency position for the purpose of securing an emergency application of the brakes. When the engineer's brake valve is placed in emergency position, there is a very rapid reduction in brake pipe pressure and a slower reduction in equalizing reservoir pressure, and it is the object of this invention to provide means for quickly reducing the equalizing reservoir pressure to zero, or approximately so, in order to insure the rapid operation of the compensator in emergency applications of the brakes and to prevent the main reservoir pressure exhausting through the compensator. Another object of the invention is to provide means whereby the equalizing reservoir venting means will not operate during all slow service reduction in brake pipe pressure, but will only operate on a sudden reduction in brake pipe pressure designed to secure an emergency application of the brakes.

In the drawings:

Fig. 1 is a diagrammatic view showing the compensator and its connections to the engineer's valve and the main reservoir and equalizing reservoir;

Fig. 2 a vertical sectional view of the compensating valve; and

Fig. 3 a similar view taken on the line III—III of Fig. 2.

Referring to the various parts by numerals, 1 designates the compensating valve; 2 the engineer's brake valve; 3 the main reservoir; and 4 the equalizing reservoir. The brake pipe 5 is connected to the engineer's brake valve by pipe 6, in the usual manner, and is connected to the compensator by pipe 7, the latter pipe being connected to the compensator at 8. The main reservoir is connected to the engineer's valve by pipe 9 and to the compensator by pipe 10, said pipe being connected to the bottom of the compensator at 11. The equalizing reservoir is connected to the engineer's valve by pipe 12 and to the compensator by pipe 13, said pipe being connected to the compensator at 14. All of these pipes are provided with the usual cut-off valves 15. The engineer's valve may be modified, as described in Patent No. 1,089,579 and also in Patent No. 1,314,975, to render the equalizing discharge piston inoperative, so that the brake pipe exhaust will be secured through the compensating valve.

The main operating parts of the compensating valve are constructed substantially as shown in Patent No. 1,314,975, and comprise a casing in which is arranged a diaphragm 16 from which depends the valve-operating yoke 17. The diaphragm 16 divides the interior of the casing into an upper equalizing chamber 18 which is in communication with the equalizing reservoir 4 through pipe 13; and a lower brake pipe chamber 19 which is at all times in communication with the brake pipe 5 through the branch pipe 7. A release valve 20 is connected to the yoke 17 and is provided with a depending winged portion which travels in a valve cage formed at the inner end of an exhaust passage 21. The yoke 17 at its lower end is provided with a horizontally extending arm 22 which is in alignment with the stem of an upwardly seating supply valve 23. The arm 22 is formed with a depending annular guide flange which engages a rigid guide carried by the valve casing. It is obvious that when diaphragm 16 is depressed by a superior pressure in the equalizing reservoir chamber 18, the exhaust valve 20 will be closed and the supply valve 23 will be opened because of the lost-motion connection between the yoke 17 and valves 20 and 23, there is a point in the movement of the diaphragm 16 at which both of said valves will be closed. This also insures the closing of one valve before the other valve is opened by the movement of the diaphragm.

The release valve 20 is formed with an upwardly extending neck 24 terminating in a head 25. The yoke 17 is provided with a forked portion 26 which receives the neck 24 and connects the release valve to the yoke.

The supply valve 23 is guided by a winged portion 27 and is held yieldingly to its seat by a spring 28 which normally forces the valve upwardly. The space in the casing below the supply valve 23 is in communication with the main reservoir through pipe 10, so that whenever said valve is opened through the operation of the diaphragm 16, main reservoir air will flow into the chamber 19 and thence to the brake pipe through opening 29.

When the engineer's brake valve is placed in emergency position, brake pipe pressure is exhausted through the brake valve more rapidly than the equalizing reservoir pressure is reduced. The result of this is that the pressure in the equalizing reservoir chamber 18 of the compensating valve will, during a certain period, exceed the pressure in the brake pipe chambers 19 of the compensating valve and the diaphragm 16 will be depressed during that period of time and the supply valve 23 will be held open. During this period the main reservoir air will pass through the compensating valve to the brake pipe and then to atmosphere through the engineer's brake valve, until the pressure in the equalizing reservoir has been exhausted, at which time the supply valve 23 will be closed.

To immediately exhaust the equalizing reservoir pressure upon a sudden reduction of brake pipe pressure, I provide the equalizing reservoir vent valve 30. This vent valve consists of a casing 31 secured to the compensating valve casing and provided with an interior bushing 32. The bore of this bushing is enlarged at its inner end to form the piston chamber 33. In this piston chamber is mounted a piston 34 having an outwardly extending piston 35 which carries at its outer end a guide head 36 which is designed to reciprocate in the bore of the bushing 32 near the outer end thereof. Connected to the piston stem is a small slide valve 37, the interior of the bushing 32 forming the seat for said valve.

The seat of the slide valve 37 is formed with a port 38 which is connected, by an annular passage 39, with a passage 40 which leads to the equalizing reservoir chamber 18. The said valve seat is also formed with an exhaust port 41 leading direct to atmosphere; and the slide valve is formed with a release groove 42 which, in release position of the valve, connects the port 41 to the port 38 to permit the equalizing reservoir chamber 18 to exhaust to atmosphere. In the normal position of the valve 37, port 38 is uncovered to permit equalizing reservoir air to flow into a chamber 43 formed by the bushing 32. A small chamber 44 is formed on the opposite side of the piston 34 from the chamber 43 and this small chamber is in communication with the brake pipe chamber 19 through a passage 45, so that the piston 34 will be subject on one side to brake pipe pressure and on its other side to the equalizing reservoir pressure. A spring 46 is arranged in the chamber 45 and bears on the piston 34, normally forcing it outwardly to hold the port 38 open and to close the exhaust port. A gasket is secured to the piston 34 and is arranged to engage an annular rib in the valve casing to prevent leakage of air around the piston when the piston is in its normal or outer position. The piston is also formed with an annular rib on its inner face which is adapted to engage a gasket when the piston is moved inwardly to its release position, said rib and gasket also preventing leakage around the piston.

The seat of the slide valve is formed with a port 47 which is in communication, through a pipe 48, with the application chamber 49 of the well-known distributing valve of the Westinghouse E. T. equipment. Port 47 is normally closed by the slide valve 37 but when the piston 34 is moved inwardly to release position, port 47 will be uncovered and pressure from the application chamber 49 will flow into the chamber 43 and hold the piston in its inner position and maintain the valve 37 in its release position.

During all slow reductions of brake pipe pressure for the purpose of securing service applications of the brakes, there will be a substantially uniform reduction of pressure in the brake pipe chamber 19 and the equalizing reservoir chamber 18. Should the brake pipe pressure be reduced more rapidly than the equalizing reservoir pressure, the difference in pressure would not be sufficient to cause a movement of the piston 34 against the spring 46. When, however, there is a sudden and pronounced reduction in brake pipe pressure for the purpose of securing an emergency application of the brakes, the equalizing reservoir pressure in chamber 43 will force the piston 34 inwardly against the spring 46 and against the brake pipe pressure in chamber 19. This movement of the piston will move the slide valve 37 and thereby uncover the port 47 and connect port 38 to the exhaust port 41. This will cut off the equalizing reservoir chamber 18 from the chamber 43 and connect said chamber to the exhaust port 41. The inward movement of the valve 37 will uncover the port 47 to permit air to flow from the application chamber 49 into the chamber 43 to hold the piston 34 and valve 37 in release position until the equalizing reservoir has been exhausted to zero, or approximately so.

The port 47 may be connected to any independent source of air pressure, the application chamber of the distributing valve being merely used as an illustration of one source from which air pressure might be obtained for the purpose of holding the piston 34 and the valve 37 in release position while exhausting the equalizing reservoir chamber. It is only ncessary that the air from this independent source shall be of sufficient pressure to hold the piston 34 in its release position against the pressure of the spring 46 and of the reduced brake pipe pressure in chamber 19.

What I claim is:

1. The combination of a compensating valve adapted to be operated by opposed brake pipe and equalizing reservoir pressures, and a vent valve subject to brake pipe and equalizing reservoir pressures and adapted to be operated by equalizing reservoir pressure upon a sudden reduction of brake pipe pressure to vent the equalizing reservoir pressure to atmosphere.

2. The combination of a compensating valve adapted to be operated by opposed brake pipe and equalizing reservoir pressures, a vent valve subject to brake pipe and equalizing reservoir pressures and adapted to be operated by equalizing reservoir pressure upon a sudden reduction of brake pipe pressure to vent the equalizing reservoir pressure to atmosphere, and means for admitting air from a separate source of supply to said vent valve to hold it in position to exhaust the equalizing reservoir pressure.

3. The combination of a compensating valve adapted to be operated by opposed brake pipe and equalizing reservoir pressures, a vent valve subject to brake pipe and equalizing reservoir pressures and adapted to be operated by equalizing reservoir pressure upon a sudden reduction of brake pipe pressure to vent the equalizing reservoir pressure to atmosphere, means for admitting air from a separate source of supply to said vent valve to hold it in position to exhaust the equalizing reservoir pressure, and means to move said valve to close the vent from the equalizing reservoir when the said reservoir pressure has been reduced to zero, or approximately so.

4. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber, and means whereby said valve will remain inactive during all slow changes of pressure in the brake pipe and equalizing reservoir chambers but will be operated to release position by the pressure in the equalizing reservoir chamber upon a sudden reduction of pressure in the brake pipe chamber, to thereby exhaust the pressure from the equalizing reservoir chamber.

5. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber, means whereby said valve will remain inactive during all slow changes of pressure in the brake pipe and equalizing reservoir chambers but will be operated to release position by the pressure in the equalizing reservoir chamber upon a sudden reduction of pressure in the brake pipe chamber, to thereby exhaust the pressure from the equalizing reservoir chamber, and means for admitting air from a separate source of supply to temporarily hold the valve in release position.

6. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber, means whereby said valve will remain inactive during all slow changes of pressure in the brake pipe and equalizing reservoir chambers but will be operated to release position by the pressure in the equalizing reservoir chamber upon a sudden reduction of pressure in the brake pipe chamber, to thereby exhaust the pressure from the equalizing reservoir chamber, means for admitting air from a separate source of supply to temporarily hold the valve in release position, and means for returning the valve to normal position to thereby close the exhaust port when the pressure in the equalizing reservoir chamber has been reduced to zero, or approximately so.

In testimony whereof I hereunto affix my signature.

SPENCER G. NEAL.